Jan. 12, 1965  D. S. STRADER  3,165,468
SEDIMENT TRAP FOR HYDRAULIC FLUID RESERVOIR
Filed Jan. 19, 1961
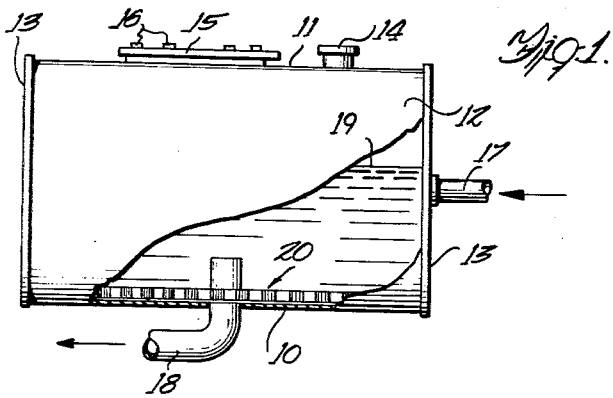
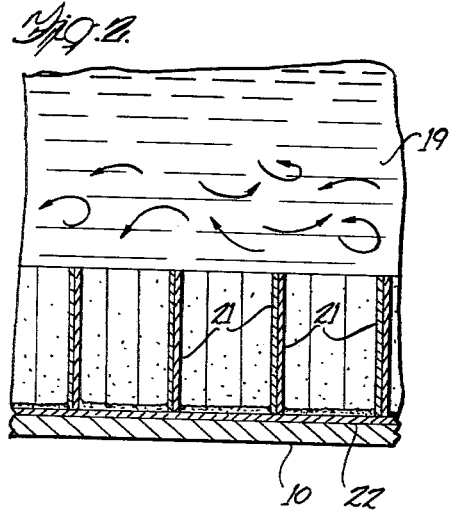
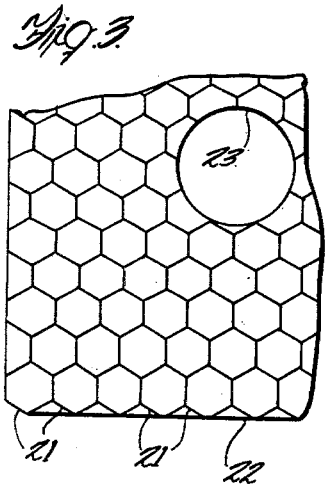
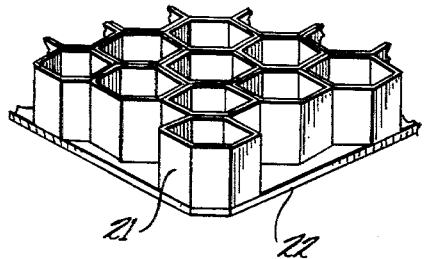
INVENTOR
DON S. STRADER
Paul O. Pippel
ATTORNEY

United States Patent Office 3,165,468
Patented Jan. 12, 1965

3,165,468
SEDIMENT TRAP FOR HYDRAULIC FLUID RESERVOIR
Don S. Strader, Mount Prospect, Ill., assignor to The Frank G. Hough Co., a corporation of Illinois
Filed Jan. 19, 1961, Ser. No. 83,780
2 Claims. (Cl. 210—172)

This invention relates generally to hydraulic systems, and more particularly to an improved hydraulic fluid reservoir construction for a hydraulic system.

Earthworking or material-handling machines such as tractor loaders generally comprise a tractor carrying some type of tool which is usually hydraulically operated. The hydraulic system for these tools necessarily includes a hydraulic fluid reservoir from which fluid is drawn by the hydraulic fluid pump and delivered to the hydraulic cylinders or motors of the tool system and returned to the reservoir. Because of the construction and use of these machines, it has been difficult in the art to maintain the fluid relatively clear of dirt or other foreign particles. Although during periods of inactivity of the machines, most foreign particles in the reservoir will settle to the bottom thereof, the later operation of the machine and consequent jostling of the reservoir causes a turbulence in the reservoir which entrains the foreign particles in the fluid delivered to the pump.

The object of the present invention is to provide a simple, economical and efficient reservoir construction which will operate to effectively remove foreign particles from the circulating hydraulic fluid of a hydraulic system for a machine such as a tractor loader.

It is a further object of the present invention to provide a sediment trap for a hydraulic fluid reservoir which is relatively simple to maintain and replace.

Other objects and features of the present invention will be apparent upon a perusal of the following specification and drawing, of which:

FIGURE 1 is a side-elevational view of a typical hydraulic fluid reservoir incorporating the present invention;

FIGURE 2 is an enlarged partial view of the structure shown in FIGURE 1;

FIGURE 3 is a top plan view of a portion of the sediment trap shown in FIGURE 1; and FIGURE 4 is an enlarged isometric view of a portion of the sediment trap shown in FIGURE 3.

The present embodiment is the preferred embodiment but it is to be understood that changes can be made in the present embodiment by one skilled in the art without departing from the spirit and scope of the present invention.

For a general description of the present invention, reference is made to the drawing. Generally, hydraulic fluid reservoirs are constructed of a somewhat rectangular boxlike shape with a relatively flat bottom. The present invention contemplates covering the bottom of the reservoir with a cellular structure which is open at the top and closed at the bottom. The dimensions of the individual cells relative to their widths and heights are such that for the degrees of turbulence experienced in the reservoir and dependent upon the viscosity of the fluid and the size of the foreign particles therein, substantially no foreign particles will be reentrained into the circulating hydraulic fluid after having once settled into the cellular structure. The cellular structure may be made of a relatively cheap material such as a plastic impregnated paper so that the initial and replacement cost for these cellular structures is relatively low. In the reduction of practice of the present invention with hydraulic fluid of the viscosity generally used in the hydraulic systems of tractor loaders, it has been found that with an individual cell diameter of approximately one quarter of an inch and with an approximate depth of one inch, an unexpectedly large amount of sediment was captured and retained by the trap during alternating periods of use and inactivity of the tractor loader.

For a detailed description of the present invention continued reference is made to the drawing. The hydraulic fluid reservoir comprises a generally rectangularly shaped container having a bottom wall 10, a top wall 11, side walls 12 and end walls 13. A filler and vent tube 14 is provided through the top wall 11, as is a cover plate 15 which is removably secured in place by fasteners 16. The one end wall 13 is provided with a hydraulic fluid conduit 17 which is connected into the interior of the reservoir substantially above the bottom wall 10. It is intended that the conduit 17 be connected to the hydraulic fluid return line of a hydraulic system for a tractor loader. A suction conduit 18 is also provided. The suction conduit 18 is secured to the reservoir through the bottom wall 10 and extends a short distance upwardly into the reservoir. It is intended that the suction line or conduit 18 be connected to the suction side of a hydraulic pump for the hydraulic system of a tractor loader. Hydraulic fluid 19 substantially fills the reservoir.

The sediment trap 20 of the subject invention is placed within the reservoir and rests upon the bottom wall 10 thereof. The sediment trap 20 comprises a plurality of individual cells 21, all secured in a contiguous relationship upon a base member 22. In the present embodiment each of the cells 21 is hexagonal in shape, although it is intended that other shapes may be used. The individual cells 21 and the base member 22 may be formed of any suitable material such as a plastic impregnated paper. Although each of the cells 21 are shown as a complete unitary cell not sharing any of the walls of an adjoining cell, the construction may be such that adjacent cells share adjacent walls. The base member 22 completely encloses the lower end of each cell 21 and the base member 22 has a length and width substantially equal to the length and width of the bottom wall 10 of the reservoir. The sediment trap 20 further is provided with an opening 23 for placement of the sediment trap over the upward extension of the suction conduit 18. For most effective control of fine sediment, the depth of each cell 21 exceeds the width or diameter of each cell 21.

When the sediment trap 20 is formed of a relatively thin and flexible material such as an impregnated paper, the sediment trap 20 may be partially bent or collapsed for insertion through the opening provided when the cover plate 15 is removed from the reservoir.

In the operation of the present invention it has been found that during a period of inactivity of the machine carrying the above described reservoir and sediment trap 20, a settlement of foreign particles from the hydraulic fluid 19 will occur with the settlement of those foreign particles into the individual cells 21 of the sediment trap 20. During a period of activity of the machine when the reservoir is jostled and fluid flows between conduits 17 and 18, the turbulence of the hydraulic fluid 19, such as shown by the arrows in FIGURE 2, will not be transmitted any appreciable depth into the individual cells 21 to raise any of the foreign particles which have previously settled therein. Further periods of inactivity will permit additional foreign particles to settle and be collected into the sediment trap 20. When an appreciable amount has settled therein, the sediment trap 20 may be removed for cleaning or replacement.

Having described the invention what is considered new and desired to be protected by Letters Patent is:

1. A hydraulic fluid reservoir comprising an enclosed container having a substantially flat bottom wall and a top wall, said top wall having an access opening, a cover plate removably securable to said top wall for covering said opening, a sediment trap having a plan configuration substantially complementary to that of said bottom wall, said trap having a base member and a plurality of substantially cylindrical cells the tops of which are open and which are secured to said base member and upstanding therefrom, said trap being formed of a substantially flexible material to permit the easy ingress and egress of said trap through said opening, whereby said sediment trap may be easily removed from and replaced in said container.

2. A hydraulic fluid reservoir according to claim 1 wherein the depth of said cells is approximately four times the diameter of said cells, whereby the sediment deposited in said cells will be substantially removed from the turbulence and entrainment in said fluid thereby prevented.

References Cited in the file of this patent

UNITED STATES PATENTS

| | | |
|---|---|---|
| 1,361,243 | Fuson | Dec. 7, 1920 |
| 1,484,953 | Marsh | Feb. 26, 1924 |
| 1,761,930 | McCuen | June 3, 1930 |
| 1,802,847 | Stolte | Apr. 28, 1931 |
| 1,892,185 | Clements | Dec. 27, 1932 |

FOREIGN PATENTS

| | | |
|---|---|---|
| 692,147 | France | Oct. 30, 1930 |